US012743091B2

(12) United States Patent
Althobaiti et al.

(10) Patent No.: US 12,743,091 B2
(45) **Date of Patent: *Sep. 22, 2026**

(54) SYSTEM, APPARATUS, AND METHOD FOR PROVIDING AUGMENTED REALITY ASSISTANCE TO WAYFINDING AND PRECISION LANDING CONTROLS OF AN UNMANNED AERIAL VEHICLE TO DIFFERENTLY ORIENTED INSPECTION TARGETS

(71) Applicant: Saudi Arabian Oil Company, Dhahran (SA)

(72) Inventors: Abdulrahman Althobaiti, Thuwal (SA); Fadl Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,425

(22) Filed: Nov. 22, 2024

(65) Prior Publication Data

US 2025/0085710 A1 Mar. 13, 2025

Related U.S. Application Data

(63) Continuation of application No. 18/048,229, filed on Oct. 20, 2022, now Pat. No. 12,197,236.

(51) Int. Cl.
*G05D 1/224* (2024.01)
*B64C 39/02* (2023.01)
(Continued)

(52) U.S. Cl.
CPC ......... *G05D 1/2247* (2024.01); *B64C 39/024* (2013.01); *B64D 45/04* (2013.01);
(Continued)

(58) Field of Classification Search
CPC .... B64U 60/20; B64U 2201/20; B64U 20/87; B64U 2101/26; B64U 70/00;
(Continued)

(56) References Cited

U.S. PATENT DOCUMENTS 7,920,071 B2 4/2011 Baillot et al.
8,577,535 B2 11/2013 Cummings
(Continued)

FOREIGN PATENT DOCUMENTS

CN 113052151 B 8/2021
CN 113359782 A 9/2021
(Continued)

OTHER PUBLICATIONS

Pierre-Jean Bristeau et al.; The Navigation and Control technology inside the AR.Drone micro UAV; Proceedings of the 18th World Congress; https://www.sciencedirect.com/science/article/pii/S1474667016438188; The International Federation of Automatic Control, Milano, Aug. 28-Sep. 2, 2011, 8 pages. 2011.
(Continued)

*Primary Examiner* — Calvin Cheung
(74) *Attorney, Agent, or Firm* — Leason Ellis LLP

(57) ABSTRACT

A method for controlling an unmanned aerial vehicle using a control apparatus, comprises: executing a navigation process by: obtaining a live video moving image from a navigation camera device of the UAV; and generating a navigation display interface for display on a display device of the control apparatus, the navigation display interface comprising a plurality of navigation augmented reality display elements related to a determined waypoint superimposed over the live video moving image; and when the UAV reaches the determined waypoint, executing a precision landing process by: generating a precision landing display interface for display on the display device, the precision
(Continued)

landing display interface comprising a plurality of precision landing AR display elements related to a landing target associated with the determined waypoint superimposed over the live video moving image obtained from a precision landing camera device of the UAV.

19 Claims, 11 Drawing Sheets

(51) Int. Cl.

| | |
|---|---|
| ***B64D 45/04*** | (2006.01) |
| ***B64U 20/87*** | (2023.01) |
| ***G05D 1/46*** | (2024.01) |
| *B64U 101/30* | (2023.01) |
| *G05D 109/20* | (2024.01) |

(52) U.S. Cl.
CPC ............. *B64U 20/87* (2023.01); *G05D 1/224* (2024.01); *G05D 1/46* (2024.01); *B64U 2101/30* (2023.01); *B64U 2201/20* (2023.01); *G05D 2109/20* (2024.01)

(58) Field of Classification Search
CPC ............. B64U 2101/30; G05D 1/2247; G05D 2109/254; G05D 2109/20; G05D 1/2249; G05D 2107/70; G05D 1/46; G05D 1/224; G05D 2105/89; B64C 39/024; B64D 45/04
See application file for complete search history.

(56) References Cited

U.S. PATENT DOCUMENTS

| | | | | |
|---|---|---|---|---|
| 9,335,764 | B2 | 5/2016 | Herz et al. | |
| 9,984,586 | B2 | 5/2018 | Popa-Simil et al. | |
| 9,996,978 | B2 | 6/2018 | Olson et al. | |
| 10,049,589 | B1 | 8/2018 | Boyd et al. | |
| 10,077,109 | B2 | 9/2018 | Ling | |
| 10,139,819 | B2 | 11/2018 | Hollida | |
| 10,198,955 | B1 | 2/2019 | Boyd et al. | |
| 10,200,659 | B2 | 2/2019 | Smolyanskiy | |
| 10,223,753 | B1 | 3/2019 | Marlow et al. | |
| 10,466,695 | B2 | 11/2019 | Bachrach et al. | |
| 10,525,332 | B2 | 1/2020 | Poynter et al. | |
| 10,532,814 | B2 | 1/2020 | Chapman et al. | |
| 10,935,987 | B2 | 3/2021 | Rose et al. | |
| 11,017,679 | B2 | 5/2021 | Moster et al. | |
| 11,030,812 | B2 | 6/2021 | Kelsey et al. | |
| 11,097,796 | B2 | 8/2021 | Abdellatif et al. | |
| 11,125,561 | B2 | 9/2021 | Taylor et al. | |
| 11,235,823 | B2 | 2/2022 | Abdelkader et al. | |
| 11,242,144 | B2 | 2/2022 | Holtz et al. | |
| 11,455,894 | B2 | 9/2022 | Henry et al. | |
| 11,472,498 | B2 | 10/2022 | Abdellatif et al. | |
| 11,869,090 | B1 | 1/2024 | Marlow et al. | |
| 11,935,288 | B2 * | 3/2024 | Connary | G05D 1/0016 |
| 12,038,767 | B2 | 7/2024 | Huang et al. | |
| 2011/0130913 | A1 | 6/2011 | Duggan et al. | |
| 2014/0010407 | A1 | 1/2014 | Sinha et al. | |
| 2015/0346722 | A1 | 12/2015 | Herz et al. | |
| 2016/0307447 | A1 * | 10/2016 | Johnson | B60L 58/12 |
| 2016/0313732 | A1 | 10/2016 | Seydoux et al. | |
| 2017/0039765 | A1 * | 2/2017 | Zhou | G06T 7/521 |
| 2017/0045894 | A1 | 2/2017 | Canoy et al. | |
| 2017/0212529 | A1 | 7/2017 | Kumar et al. | |
| 2017/0313439 | A1 | 11/2017 | Holt et al. | |
| 2017/0366751 | A1 * | 12/2017 | Terry | H04W 24/08 |
| 2018/0095469 | A1 | 4/2018 | Leurent | |
| 2018/0190132 | A1 * | 7/2018 | Cronkhite | G08G 5/32 |
| 2018/0249343 | A1 * | 8/2018 | Priest | G06T 17/00 |
| 2019/0149725 | A1 * | 5/2019 | Adato | H04N 1/00 348/158 |
| 2019/0174149 | A1 * | 6/2019 | Zhang | H04N 21/4728 |
| 2019/0250601 | A1 * | 8/2019 | Donahoe | G05D 1/101 |
| 2019/0266404 | A1 * | 8/2019 | Spivack | G06V 20/35 |
| 2019/0354116 | A1 | 11/2019 | Shomin et al. | |
| 2020/0172184 | A1 | 6/2020 | Abdellatif et al. | |
| 2020/0174478 | A1 | 6/2020 | Abdellatif et al. | |
| 2021/0094180 | A1 | 4/2021 | Szafir et al. | |
| 2021/0174086 | A1 * | 6/2021 | Cunningham | G06N 3/08 |
| 2021/0287559 | A1 | 9/2021 | Jeong et al. | |
| 2022/0397915 | A1 | 12/2022 | Ortman | |

FOREIGN PATENT DOCUMENTS

| | | | |
|---|---|---|---|
| EP | 1835370 | A2 | 9/2007 |
| EP | 3078402 | A1 | 10/2016 |
| JP | 7083010 | B2 | 12/2020 |
| KR | 20170136133 | A | 12/2017 |
| WO | 2017120363 | A1 | 7/2017 |
| WO | 2021230948 | A2 | 11/2021 |

OTHER PUBLICATIONS

Mohammad Fattahi Sani et al.; Automatic Navigation and Landing of an Indoor AR. Drone Quadrotor Using ArUco Marker and Inertial Sensors; Faculty of Electrical and Computer Engineering, University of Tabriz, Iran. Downloaded from IEEE Xplore, https://ieeexplore.ieee.org/document/8270408; Oct. 31, 2022; 6 pages. 2022.

Aurello Patrik et al.; GNSS based navigation systems of autonomous drone for delivering items; Journal of Big Data; https://link.springer.com/article/10.1186/s40537-019-0214-3; Jun. 14, 2019; 14 pages. 2019.

Dijkshoorn; Simultaneous localization and mapping with the AR. Drone; Universiteit van Amsterdam; Jul. 14, 2012; 117 pages. 2012.

* cited by examiner

SYSTEM, APPARATUS, AND METHOD FOR PROVIDING AUGMENTED REALITY ASSISTANCE TO WAYFINDING AND PRECISION LANDING CONTROLS OF AN UNMANNED AERIAL VEHICLE TO DIFFERENTLY ORIENTED INSPECTION TARGETS

CROSS-REFERENCE TO RELATED APPLICATION

This application is a Continuation of, and claims priority from, U.S. patent application Ser. No. 18/048,229, titled SYSTEM, APPARATUS, AND METHOD FOR PROVIDING AUGMENTED REALITY ASSISTANCE TO WAYFINDING AND PRECISION LANDING CONTROLS OF AN UNMANNED AERIAL VEHICLE TO DIFFERENTLY ORIENTED INSPECTION TARGETS, filed on Oct. 20, 2022, which is hereby incorporated by reference in its entirety.

FIELD OF THE DISCLOSURE

The present disclosure generally relates to the control of an unmanned aerial vehicle (UAV), and specifically to using augmented reality (AR) display features for respective wayfinding and precision landing control modes during inspection and/or maintenance of a structure.

BACKGROUND OF THE DISCLOSURE

Industrial structures require periodic inspection and maintenance, especially those that involve corrosive and/or hazardous materials at high volumes. Such industrial structures can include metallic assets—for example, pipes, vessels, storage tanks, and the like—for which periodic inspections are extremely important to check their integrity and ensure proactive measures are taken before a failure happens.

The inspections can be difficult or impractical to perform by humans in some environments and frequent inspections can be laborious, requiring significant manpower. In some cases, temporary structures, such as scaffolding, need to be erected to access inspection areas when the asset that needs to be inspected is elevated. This translates to significant costs.

The use of unmanned aerial vehicles (UAVs) has been proposed for inspecting industrial structures, especially for those that include hard to reach assets.

U.S. Pat. No. 11,097,796 (the '796 Patent) filed on Nov. 19, 2019 for Abdellatif et al. and issued on Aug. 24, 2021; U.S. Pat. No. 11,235,823 (the '823 Patent) filed on Nov. 26, 2019 for Abdelkader et al. and issued on Feb. 1, 2022; U.S. Pat. No. 11,472,498 (the '498 Patent) filed on Nov. 20, 2019 for Abdellatif et al. and issued on Oct. 18, 2022; U.S. Patent Application Publication No. 2020/0174478 filed on Nov. 25, 2019 for Abdellatif et al. and published on Jun. 4, 2020; and U.S. Patent Application Publication No. 2020/0172184 filed on Nov. 20, 2019 for Abdellatif et al. and published on Jun. 4, 2020 all disclose various types of inspection techniques using UAVs, in some cases autonomous UAVs. These citations are hereby incorporated by reference in their entirely.

While development of autonomous UAV inspection techniques are ongoing, there is still a need for human conducted, or hybrid, inspection techniques, where UAVs at least partially controlled by an operator are used so that operator confirmations of inspections are integrated with the inspection operations.

Some existing hybrid inspection drones include an operator piloting the drone manually using a tablet or wearable device with no navigation guidance. In such cases, the operator must rely upon isometric drawings that show the asset and inspection point location. The operator must then follow these drawings (typically printed on paper) to recognize a desired inspection location and, thus, land on it. The biggest obstacle that the operators face in these scenarios is landing the drone manually without any instructions on how to reach an area of interest and where to land exactly on the asset. This can result in performing inspections on incorrect locations, thus compromising the accuracy and quality of the inspections.

SUMMARY OF THE DISCLOSURE

In view of the deficiencies of the currently available UAV control schemes for industrial inspections, the present disclosure provides a technical solution to support a pilot during various phases of drone navigation during an inspection-namely, navigating from a home location on the ground to a vicinity of an inspection point and then perform precision landing on an exact inspection point desired to be investigated.

The present disclosure provides an automated UAV (or drone) that is adapted to provide AR visual display indicators for one or more paths to respective inspection points at industrial assets onto a captured image by a navigation camera of the UAV that is displayed to a pilot to aid a pilot on navigating to the respective inspection points. Once the UAV has been navigated to a vicinity of one of the inspection points, the visual display scheme is switched from a navigation mode to a precision landing mode, where the display is switched from an image captured by the navigation camera to an image captured by a precision landing camera disposed on the UAV and oriented towards a landing area associated with the inspection point. The precision landing display scheme further includes one or more AR visual display indicators related to the positioning and orientation of the UAV to aid the pilot on landing the UAV at an appropriate location in the landing area associated with the inspection point.

According to an example implementation consistent with the present disclosure, an apparatus for controlling an unmanned aerial vehicle (UAV), comprises: a communication interface to the UAV; one or more processing devices operatively connected to the communication interface; a display device operatively connected to the one or more processing devices; and one or more memory storage devices operatively connected to the one or more processing devices and having stored thereon machine-readable instructions that cause the one or more processing devices, when executed, to: obtain localization data associated with the UAV in relation to an environment of the UAV from a plurality of location and orientation sensors of the UAV; execute a navigation process by: obtaining, via the communication interface, a live video moving image from a first camera device of the UAV; determining a waypoint associated with an inspection point for inspecting a structure; and generating a navigation display interface for display on the display device, the navigation display interface comprising a plurality of navigation augmented reality (AR) display elements related to the determined waypoint superimposed over the live video moving image obtained from the first camera device of the UAV; and when the UAV reaches the determined waypoint, execute a precision landing process by: obtaining, via the communication interface, a live video moving image from a second camera device of the UAV; and generating a precision landing display interface for display on the display device, the precision landing display interface comprising a plurality of precision landing AR display elements related to a landing target associated with the determined waypoint superimposed over the live video moving image obtained from the second camera device of the UAV, wherein the plurality of navigation AR display elements and the plurality of precision landing AR display elements are generated based on the localization data obtained from the plurality of location and orientation sensors of the UAV.

According to one example implementation, the navigation AR elements comprise an indication for an optimum path to the determined waypoint.

According to one example implementation, the navigation AR elements comprise an indication for the landing target associated with the determined waypoint.

According to one example implementation, the precision landing AR elements comprise a plurality of indicators for respective vertical and horizontal distances between the UAV and the landing target.

According to one example implementation, the first camera device is oriented as a navigation camera device and the second camera device is oriented as a precision landing camera device.

According to one example implementation, the plurality of indicators are determined based on an orientation of the precision landing camera device, wherein the orientation is adjustable based on an orientation of the landing target on the structure.

According to one example implementation, the machine-readable instructions further comprise, for the precision landing process, instructions for: generating one or more control instruction signals based on corresponding one or more user inputs received via a user interface associated with the display device; and transmitting the generated one or more control signals to the UAV.

According to one example implementation, the landing target overlaps the inspection point.

According to one example implementation, the landing target does not overlap the inspection point.

According to an example implementation consistent with the present disclosure, a method for controlling an unmanned aerial vehicle (UAV) using a control apparatus, comprises: obtaining, via a communication interface, localization data associated with the UAV in relation to an environment of the UAV from a plurality of location and orientation sensors of the UAV; executing, by a processing device of the control apparatus, a navigation process by: obtaining, via the communication interface, a live video moving image from a first camera device of the UAV; determining a waypoint associated with an inspection point for inspecting a structure; and generating a navigation display interface for display on a display device of the control apparatus, the navigation display interface comprising a plurality of navigation augmented reality (AR) display elements related to the determined waypoint superimposed over the live video moving image obtained from the first camera device of the UAV; and when the UAV reaches the determined waypoint, executing, by the processing device of the control apparatus, a precision landing process by: obtaining, via the communication interface, a live video moving image from a second camera device of the UAV; and generating a precision landing display interface for display on the display device, the precision landing display interface comprising a plurality of precision landing AR display elements related to a landing target associated with the determined waypoint superimposed over the live video moving image obtained from the second camera device of the UAV, wherein the plurality of navigation AR display elements and the plurality of precision landing AR display elements are generated based on the localization data obtained from the plurality of location and orientation sensors of the UAV.

According to one example implementation, the navigation AR elements comprise an indication for an optimum path to the determined waypoint.

According to one example implementation, the navigation AR elements comprise an indication for the landing target associated with the determined waypoint.

According to one example implementation, the precision landing AR elements comprise a plurality of indicators for respective vertical and horizontal distances between the UAV and the landing target.

According to one example implementation, the first camera device is oriented as a navigation camera device and the second camera device is oriented as a precision landing camera device.

According to one example implementation, the plurality of indicators are determined based on an orientation of the precision landing camera device, wherein the orientation is adjustable based on an orientation of the landing target on the structure.

According to one example implementation, the method further comprises, for the precision landing process: generating one or more control instruction signals based on corresponding one or more user inputs received via a user interface associated with the display device; and transmitting the generated one or more control signals to the UAV.

According to one example implementation, the landing target overlaps the inspection point.

According to one example implementation, the landing target does not overlap the inspection point.

BRIEF DESCRIPTION OF THE DRAWING FIGURES

Various example implementations of this disclosure will be described in detail, with reference to the following figures, wherein.

DETAILED DESCRIPTION OF CERTAIN EMBODIMENTS OF THE DISCLOSURE

Figure 1:
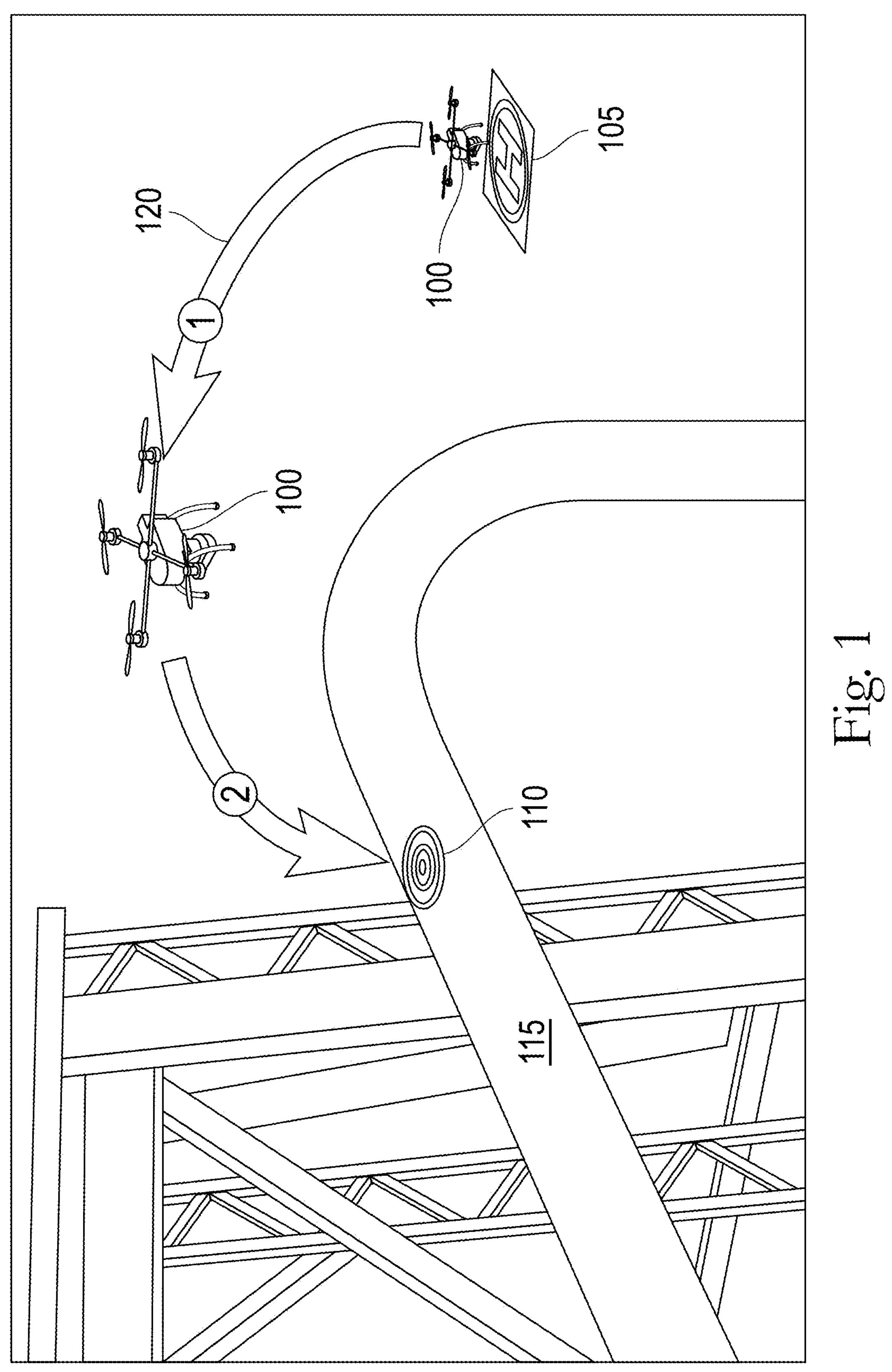
FIG. 1 is an illustration of two operating modes of an unmanned aerial vehicle (UAV) during inspection or maintenance of a structure according to an example embodiment of the present disclosure.

By way of overview and introduction, in the oil and gas industry, all assets, such as pipes, are divided into various inspection points that need to be inspected regularly. The numerous inspection points in any given facility require significant time and labor to conduct periodic inspections. Furthermore, hard to access inspection locations require access preparations-such as erecting scaffoldings and the like—for an operator of a handheld inspection device. Consequently, there have been numerous developments in autonomous UAVs with various features for conducting the periodic inspections, especially at difficult to access locations. While developments in autonomous UAVs are ongoing, there is still a need for operator-conducted inspections that incorporates real-time confirmations and reviews of the inspections to ensure their accuracy. However, the available UAV control schemes are cumbersome and does not lend to effective navigation and controls of a UAV for inspecting industrial assets, which are often separated by circuitous paths with many obstacles.

The present disclosure concerns a UAV having an improved navigation and precision landing control scheme for aiding a pilot on controlling UAV inspecting or maintaining a structure. Advantageously, the UAV of the present disclosure is configured to provide Augmented Reality (AR) feedback to a pilot in aid of controlling the UAV during an inspection of structures (e.g., pipes and storage tanks) at elevated or otherwise difficult-to-access locations. In an exemplary embodiment, the UAV is a hybrid UAV that has advanced capabilities to perform contact inspection jobs on curved ferromagnetic surfaces such as carbon steel pipes, storage tanks, and other structures. In use, the UAV is controlled by the pilot to fly towards a structure to be inspected based on AR guidance on the navigation towards each identified inspection point. Once in the vicinity of an inspection point, the UAV is capable of switching to a precision landing mode, where the display is changed from a navigation view to a landing view, with AR feedback on UAV position and orientation information to aid the pilot on landing or at least partially attaching the UAV to structure to perform the inspection.

As noted, the inspection and maintenance of exposed metallic assets, such as pipes, storage tanks, and the like, can sometimes be difficult or impractical to perform by an operator in person. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Thus, an operator-controlled UAV is a valuable tool for performing operator inspections, especially at critical inspection locations. The present disclosure provides a technical improvement to the control scheme for an operator-controlled UAV for such inspections.

FIG. 1 is an illustration of a UAV 100 navigating from a home base 105 to an inspection point 110 on a pipe structure 115 with highlights on portions of the path 120 therebetween at which the respective navigation and precision landing modes are executed according to an example implementation of the present disclosure.

As illustrated in FIG. 1, UAV 100 is initially (1) navigated from the home base 105 to a vicinity of inspection point 110; and then, (2) switched to a precision landing mode once it reaches a vicinity of the inspection point 110. In the (1) navigation mode, the display features on the control device of the operator includes AR elements that indicate one or more waypoints (e.g., at or in the vicinity of one or more respective inspection points) and corresponding paths thereto and/or therebetween. In the (2) precision landing mode, the display features on the control device of the operator are switched from the navigation mode display features to precision landing features that focus on the relative positioning and orientation of UAV 100 towards inspection point 110, now a landing target, and any surrounding obstacles. Advantageously, the switchable display modes streamline the UAV navigation for the operator and reduces the navigation time needed for conducting numerous inspections and, thereby, improve the efficiency of such inspections.

Figure 2A:
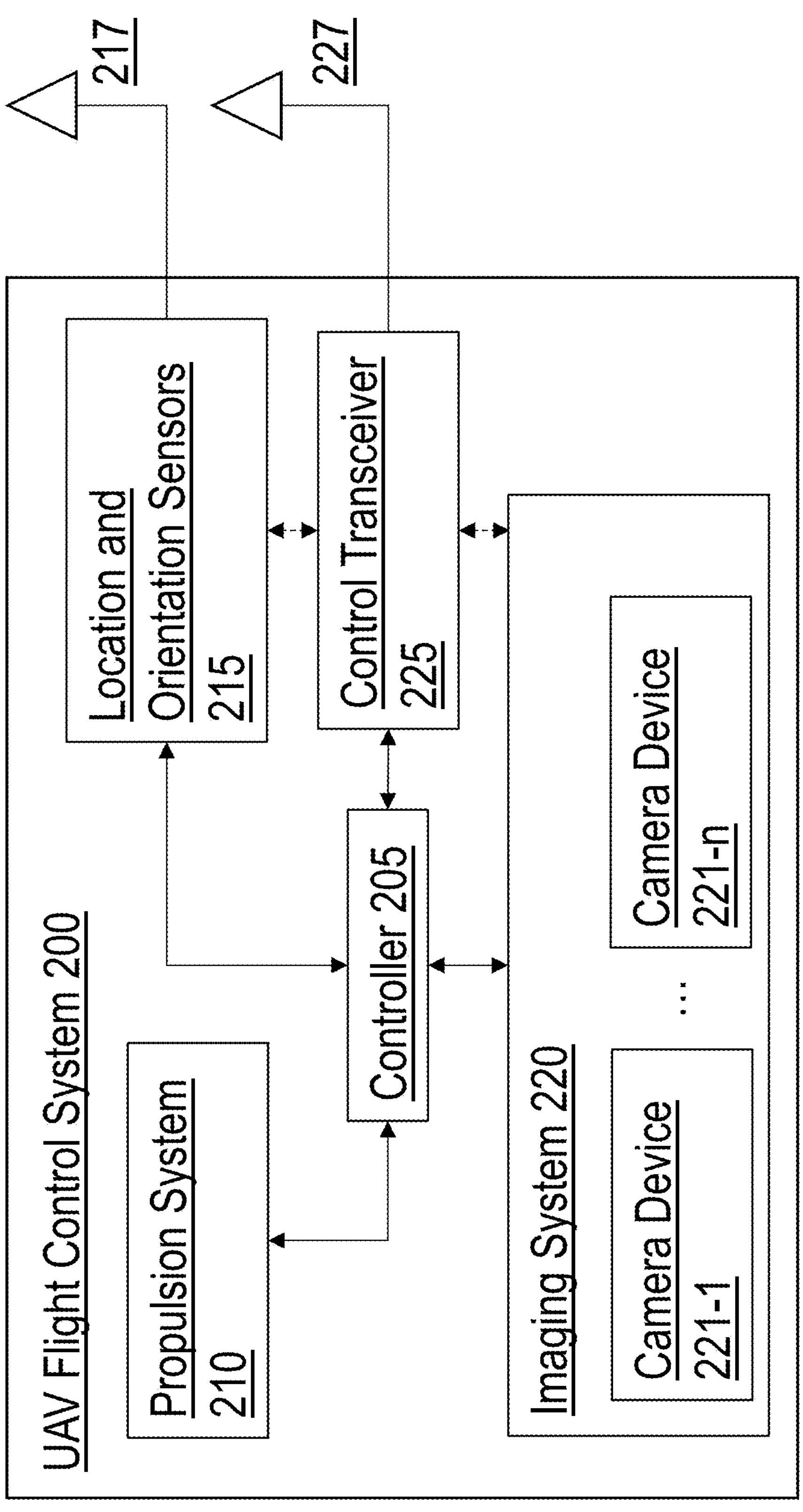
FIG. 2A is a schematic diagram of a flight control system onboard a UAV according to an example implementation of the present disclosure.

FIG. 2A is a schematic diagram of a flight control system 200 onboard UAV 100 according to an example implementation of the present disclosure. As illustrated in FIG. 2A, UAV flight control system 200 incorporates a main controller 205 that is communicatively coupled to a propulsion system 210, location and orientation sensors 215, an imaging system 220, and a control transceiver 225.

Controller 205 is a processing device adapted to carry out the general control of UAV 100, including its navigation and any ancillary inspection tasks, such as structure scanning, inspection sensor reading, and the like. In embodiments, controller 205 can be a custom or preprogrammed logic device, circuit, or processor, such as a programmable logic circuit (PLC), or other circuit (e.g., Application-specific integrated circuit (ASIC), Field-programmable gate array (FPGA), and the like) configured by code or logic to carry out control and navigation tasks of UAV 100.

Propulsion system 210 incorporates the mechanisms adapted to propel UAV 100 in its navigation. According to an exemplary embodiment, propulsion system 210 comprises four drone propellers (for example, as illustrated in FIG. 1) and corresponding motors (not shown) for driving the propellers at prescribed speeds and/or directions in response to control signals from controller 205. In embodiments, propulsion system 210 can include electronic speed controllers (ESC)(not shown) for controlling the motors of UAV 100.

Location and orientation sensors 215 includes the sensors and mechanisms adapted to determine the location and orientation of UAV 100. In an example implementation, location and orientation sensors 215 comprise a global navigation satellite system (GNSS) or global positioning system (GPS) receiver (or transceiver) (e.g., via antenna 217) to provide real-time location determinations for UAV 100. Sensors 215 can be adapted for differential GPS or Real-Time Kinetmatics (RTK) for more accurate location determinations, which are applicable in oil and gas facilities where congested pipes and vessels can degrade a GPS signal due to multi-path syndrome. According to an example implementation, sensors 215 further comprise an Inertial Measurement Unit (IMU)(not shown) that detects acceleration rates of UAV 100—for example, using one or more accelerometers. Additionally, the IMU detects changes in rotational attributes of UAV 100—such as pitch, roll, and yaw-using one or more gyroscopes. In embodiments, the IMU can also comprise a magnetometer for orientation calibration of UAV 100. In accordance with an example implementation, sensors 215 also incorporate a three-dimensional (3D) light detection and ranging (LIDAR) mechanism (not shown) adapted to provide a full 3D point cloud that represents the environment and obstacles around UAV 100 in a facility during an inspection operation.

Imaging system 220 incorporates a plurality of camera devices 221-1 . . . **221-*n* (or collectively 221) that capture various moving and/or static images around UAV 100. In an example implementation, camera devices 221 include a forward oriented navigation camera and a downward oriented precision landing camera. In embodiments, camera devices 221 can further include a depth camera or a stereo-camera to provide an RGB-D (depth) datastream that can be analyzed to detect a structure or an asset for determining a landing point associated with an inspection point (e.g., inspection point 110). In embodiments, the analysis can be conducted, at least in part, by controller 205**.

Control transceiver 225 incorporates one or more radio transceivers (e.g., via antenna 227) for receiving control signals from a user device of an operator for controlling UAV 100 and for transmitting information from sensors 215 and imaging system 220 to the user device for interpretation and for providing the requisite data to render the AR guide display elements on a display of the user device. In embodiments, a portion of the data interpretation can be conducted by controller 205. Thus, in accordance with an exemplary embodiment, UAV flight control system 200 communicates via control transceiver 225 with a user device and/or a remote-control apparatus to implement a first person view (FPV) for controlling UAV 100, said FPV being switchable between a navigation mode ((1) in FIG. 1) and a precision landing ((2) in FIG. 1) that are respectively augmented with AR visual guidance elements.

Figure 2B:
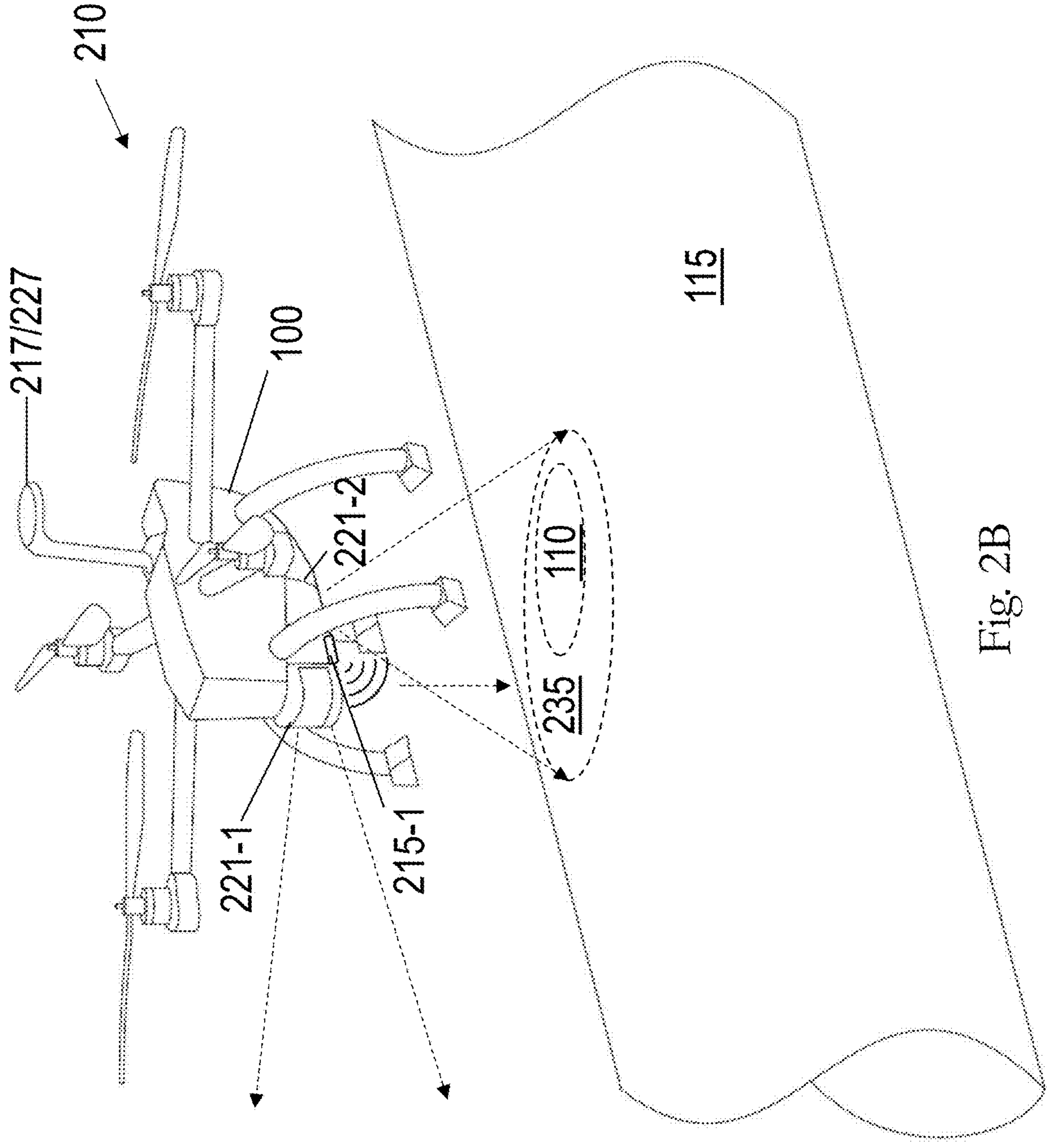
FIG. 2B is a perspective view of a UAV illustrating an arrangement of certain elements of flight control according to an exemplary embodiment of the present disclosure.

FIG. 2B is a perspective view of UAV 100 illustrating an arrangement of certain elements of flight control 200 according to an exemplary embodiment of the present disclosure. As shown in FIG. 2B, UAV 100 incorporates four (4) propellers as part of its propulsion system 210 and an antenna element 217/227 for control transceiver 225 and a GPS receiver (as part of location and orientation sensors 215). In embodiments, UAV 100 can incorporate plural separate antenna elements. As further illustrated in FIG. 2B, a navigation camera device 221-1 is oriented on UAV 100 in a generally forward facing direction and a precision landing camera device 221-2 is oriented in a generally downward facing direction. FIG. 2B includes an illustration of pipe structure 115 for showing a capture range 235 of camera device 221-2 (e.g., during precision landing mode (2)) for landing UAV 100 at or near landing target (or inspection point) 110.

Figure 3:
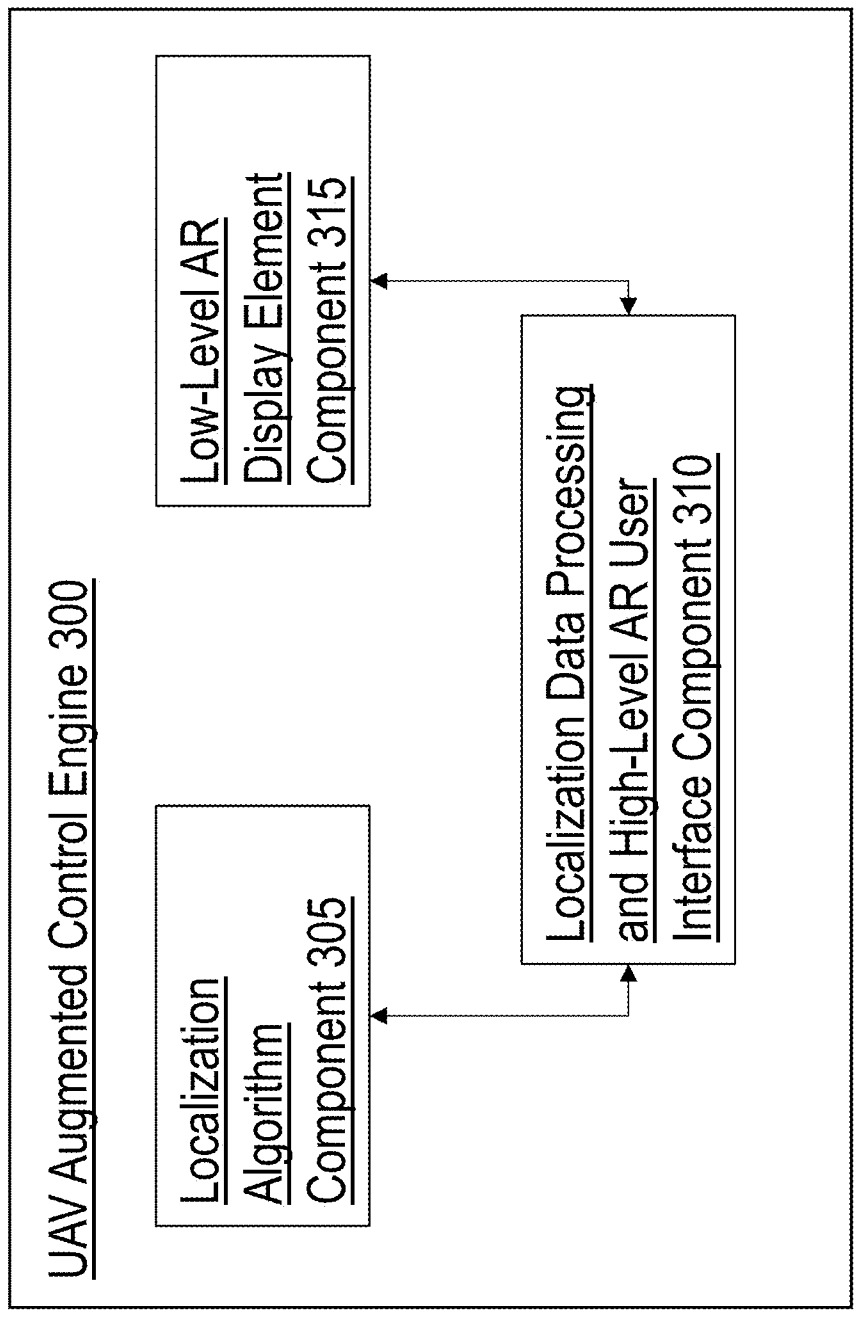
FIG. 3 is a schematic diagram of a UAV augmented control engine adapted to provide the AR visual guidance to a control display associated with a UAV in accordance with an example implementation of the present disclosure.

FIG. 3 is a schematic diagram of a UAV augmented control engine 300 adapted to provide the AR visual guidance to a control display associated with UAV 100 in accordance with an example implementation of the present disclosure. In embodiments, UAV control engine 300, or portions thereof, can be incorporated or executed at a user device and/or a remote-control apparatus of an operator, controller 205 onboard UAV 100, or an apparatus in communication (e.g., via network and/or wireless communication) with one or more of the user device, remote-control apparatus, and UAV 100.

As illustrated in FIG. 3, UAV control engine 300 comprises a component for localization algorithms 305, a component for localization data processing in generating high-level AR user interfaces (UI) 310, and a component for low-level AR display elements 315.

The localization algorithm component 305 comprises one or more data processing components adapted to determine a location of UAV 100 in relation to its environment based upon detections, measurements, calculations, and the like, by one or more of controller 205, location and orientation sensors 215, and imaging system 220 of UAV 110. Component 305 can be integrated and/or executed, at least in part, at controller 205.

In the navigation mode of UAV 100 (e.g., (1) in FIG. 1), component 305 is adapted to employ Visual odometry (VO) or Visual inertial odometry (VIO) based on information captured by imaging system 220 (such as stereo cameras or depth cameras) in conjunction with data from sensors 215 (such as IMUs), to determine an accurate location of UAV 100 based on the environmental configuration through the visual imagery from imaging system 220 and to deduce the movement and rotation of UAV 100 based on information from sensors 215.

According to an exemplary embodiment, component 305 comprises optical flow algorithms to perform localization and one or more machine learning (ML) models to perform object tracking and odometry. Additionally, Simulations Localization and Mapping (SLAM) algorithms can be used to determine the location of UAV 100 in the environment based on a point cloud provided by a 3D LIDAR mechanism incorporated in sensors 215, especially for inspections without a pre-existing map available. For inspections at facilities where a map is available, component 305 can incorporate algorithms such as particle filters for the localization task. Accordingly, portions of component 305 can be integrated and/or executed at one or more processing apparatuses in communication with UAV 100 or a user device/remote-control apparatus associated therewith.

In the precision landing mode of UAV 100 (e.g., (2) in FIG. 1), component 305 is adapted to determine a landing target location (e.g., on a pipe) with respect to UAV 100. A structure related to the landing target location (e.g., on the pipe) can be detected using a 3D LIDAR mechanism incorporated in sensors 215 to determine its location with respect UAV 100. According to an example implementation, 3D object segmentation and detection algorithms, such as Random sample consensus (RANSAC), Hough Transform, and the like, are incorporated to analyze the 3D point cloud from sensors 215 and determine the landing target location.

In embodiments, depth data (e.g., RGB-D from imaging system 220) can be used alone as a point cloud in the 3D point cloud analysis algorithms. Additionally, the depth data can be used in conjunction with image processing and computer vision algorithms, such as edge detection, template matching, and scale-invariant feature transform (SIFT) algorithms for the landing target location task. In embodiments, component 305 can further incorporate machine learning (ML) algorithms, such as convolutional neural networks (CNNs) for the landing target location task. Accordingly, portions of component 305 can be integrated and/or executed at one or more processing apparatuses in communication with UAV 100 or a user device/remote-control apparatus associated therewith.

The localization data processing and high-level component 310 comprises one or more data processing components adapted to translate the determined location and environmental information regarding UAV 100 by localization algorithm component 305 into a real-time moving display (or one or more static displays) that incorporates AR elements to provide navigation or landing guidance based on the determined location and environmental information. Component 310 can be integrated and/or executed, at least in part, at controller 205. In an exemplary embodiment, elements of component 310 are integrated and/or executed, at least in part, at a user device and a processing apparatus in communication with the user device.

The low-level AR display element component 315 comprises one or more data processing components adapted to provide low-level AR visualizations on a display of an operator's user device and anchoring the visualization objects in 3D space. In accordance with an example implementation, component 315 processes data to be visualized from the localization algorithm component 305 and the high-level UI design component 310 to generate appropriate low-level AR display elements for both a wayfinding/navigation display mode and a precision landing display mode. Accordingly, component 310 sets up the types of 3D models to be presented in appropriate locations on a display—for example, one or more AR 3D arrows to show one or more paths for navigating to corresponding one or more targets and AR 3D circles to indicate waypoint(s) or landing target(s). Additionally, component 310 calculates the positions of the 3D models where navigation is presented in a viewer coordinate system—for example, pixel translations to a display of an operator's user device. Thus, component 310 translates the localization data from localization algorithm component 305 and from the localization data processing of component 310 into a visualized augmented reality feature and generates the displays of the localization data for a display of an operator's user device—for example, augmented reality hardware such as AR goggles, a tablet computer, and the like.

Figure 4:
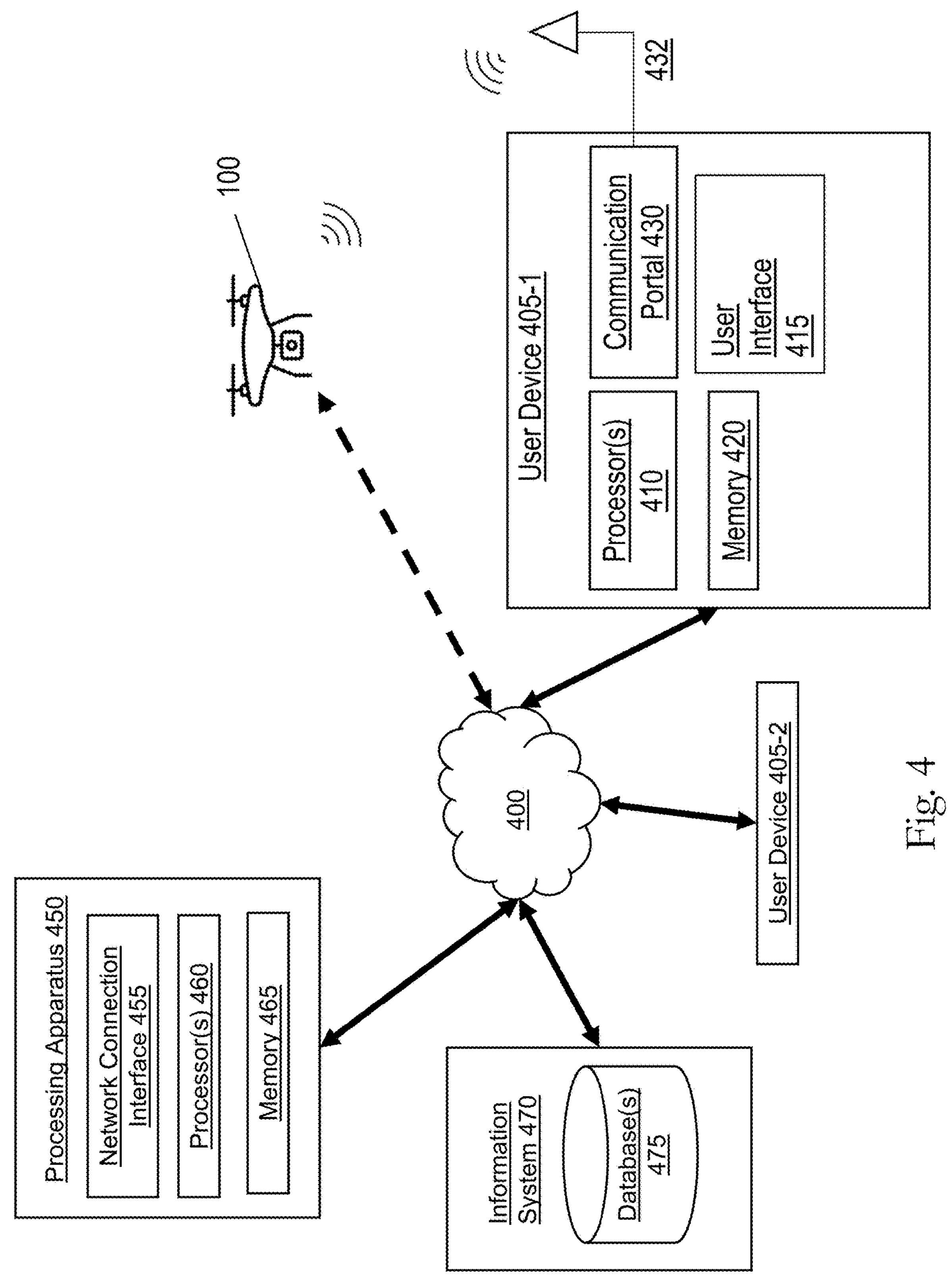
FIG. 4 is a schematic diagram illustrating a network arrangement for implementing at least a portion of the UAV augmented control engine of FIG. 3 according to an exemplary embodiment of the present disclosure.

FIG. 4 is a schematic diagram illustrating a network arrangement for implementing at least a portion of UAV augmented control engine 300 according to an exemplary embodiment of the present disclosure. As shown in FIG. 4, a network 400 serves as a communication hub among user devices 405-1 and 405-2, processing apparatus 450, and information system 470. In embodiments, UAV 100 can include a network communication device (e.g., as part of control transceiver 225) for directly communicating with the various entities communicatively connected to network 400.

Communications systems for facilitating network 400 include hardware (e.g., hardware for wired and/or wireless connections) and software. Wired connections can use coaxial cable, fiber, copper wire (such as twisted pair copper wire), and/or combinations thereof, to name a few. Wired connections can be provided through Ethernet ports, USB ports, and/or other data ports to name a few. Wireless connections can include Bluetooth, Bluetooth Low Energy, Wi-Fi, radio, satellite, infrared connections, ZigBee communication protocols, to name a few. In embodiments, cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6G to name a few) can be included.

User devices 405-1 and 405-2 can be any computing device and/or data processing apparatus capable of embodying the systems and/or methods described herein and can include, for each corresponding user, any suitable type of electronic device including, but are not limited to, workstations, desktop computers, mobile computers (e.g., laptops, ultrabooks), mobile phones, portable computing devices, such as smart phones, tablets, personal display devices, personal digital assistants ("PDAs"), virtual reality (VR) devices, wearable devices (e.g., watches), to name a few. User devices 405-1 and 405-2 incorporate network access to network 400 that is uniquely identifiable by Internet Protocol (IP) addresses and Media Access Control (MAC) identifiers.

User device 405-1 is illustrated in FIG. 4 as an exemplary schematic arrangement for user device 405-2 (and any additional user devices communicatively connected to network 400) that provides a user (e.g., an operator of UAV 100) with access to network 400 and an augmented control interface for controlling UAV 100. As shown in FIG. 4, user device 405-1 includes processor(s) 410, user interface 415, memory 420, and communication portal 430.

One or more processor(s) 410 can include any suitable processing circuitry capable of controlling operations and functionality of user device 405-1, as well as facilitating communications between various components within user device 405-1. In some embodiments, processor(s) 410 can include a central processing unit ("CPU"), a graphic processing unit ("GPU"), one or more microprocessors, a digital signal processor, or any other type of processor, or any combination thereof. In some embodiments, the functionality of processor(s) 410 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 410 can include its own local memory, which can store program systems, program data, and/or one or more operating systems.

User interface 415 is operatively connected to processor(s) 410 and can include one or more input or output device(s), such as switch(es), button(s), key(s), touch screen(s), VR glove(s), joystick(s), a display (e.g., VR glasses or headset), microphone, camera(s), sensor(s), etc. as would be understood in the art of electronic computing devices.

Memory 420 can include one or more types of storage mediums, such as any volatile or non-volatile memory, or any removable or non-removable memory implemented in any suitable manner to store data for user device 405-1. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 420 can be implemented as computer-readable storage media ("CRSM"), which can be any available physical media accessible by processor(s) 410 to execute one or more instructions stored within memory 420. According to an exemplary embodiment, one or more applications corresponding to UAV augmented control engine 300 are stored in memory 420 and executed by processor(s) 410.

Communication portal 430 can use any of the previously mentioned exemplary communications protocols for communicating with UAV 100. Additionally, communication portal 430 can comprise one or more universal serial bus ("USB") ports, one or more Ethernet or broadband ports, and/or any other type of hardwire access port to communicate with network 400. As shown in FIG. 4, communication portal 430 includes one or more antenna(s) 432 to facilitate direct wireless communications with UAV 100 using various wireless technologies (e.g., Wi-Fi, Bluetooth, radiofrequency, etc.) in correspondence with antenna 227 of UAV 100.

Processing apparatus 450 is a computing apparatus, such as a server apparatus, desktop computer, and the like—comprised of a network connection interface 455 for communicatively connecting to network 400, one or more processor(s) 460, and memory 465. Exemplary implements of network connection interface 455 can include those described above with respect to communication portal 430, which will not be repeated here. One or more processor(s) 460 can include any suitable processing circuitry capable of controlling operations and functionality of processing apparatus 450, as well as facilitating communications between various components within processing apparatus 450. Exemplary implements of processor(s) 460 can include those described above with respect to processor(s) 410, which will not be repeated here. Memory 465 can include one or more types of storage mediums, such as any volatile or non-volatile memory, or any removable or non-removable memory implemented in any suitable manner to store data for processing apparatus 450, exemplary implements of which can include those described above with respect to memory 420 and will be not repeated here.

According to an exemplary embodiment, processing apparatus 450 processes at least portions of UAV augmented control engine 300—i.e., localization algorithm component 305, localization data processing and high-level AR user interface component 310, and low-level AR display element component 315. Such portions can include without limitation processing localization information related to UAV 100, determining environmental status (e.g., machine learning localization processing and/or facility map retrieval and processing), inspection status tracking, inspection location determinations, UAV routing and scheduling, to name a few. In embodiments, executable portions of UAV augmented control engine 300 can be offloaded to user devices 405-1 and 405-2. For example, graphical user interface renderings and the like can be locally executed at user devices 405-1 and 405-2.

Information system 470 incorporates database(s) 475 that embodies servers and corresponding storage media for storing data associated with UAV 100, user devices 405-1 and 405-2, and processing apparatus 450 as will be understood by one of ordinary skill in the art. Exemplary storage media for database(s) 475 correspond to those described above with respect to memory 420, which will not be repeated here. According to an exemplary embodiment, information system 470 incorporates databases 475 to store, for example, data associated with UAV augmented control engine 300, including without limitation localization information related to UAV 100, environmental data (e.g., machine learning localization data and/or facility mapping data), inspection status data, inspection location data, UAV routing and scheduling data, to name a few. Information system 340 incorporates a network connection interface (not shown) for communications with network 400 and exemplary implements of which can include those described above with respect to communication portal 430, which will not be repeated here.

It should be appreciated that the arrangement of FIG. 4 is applicable for controlling multiple UAVs (100) using one or more user devices 405. For example, user device 405-1 can control multiple UAVs in a sequential order on respective inspection programs for inspecting one or more respective inspection points. In embodiments, user device 405-1 can control multiple UAVs concurrently with a capability of switching among the UAV augmented control engine 300 associated with the respective UAVs for focused controls. With reference back to FIG. 3, elements of component 310 are, again, integrated and/or executed, at least in part, at user device 405-1 and processing apparatus 450 in communication with the user device 405-1.

Figure 5:
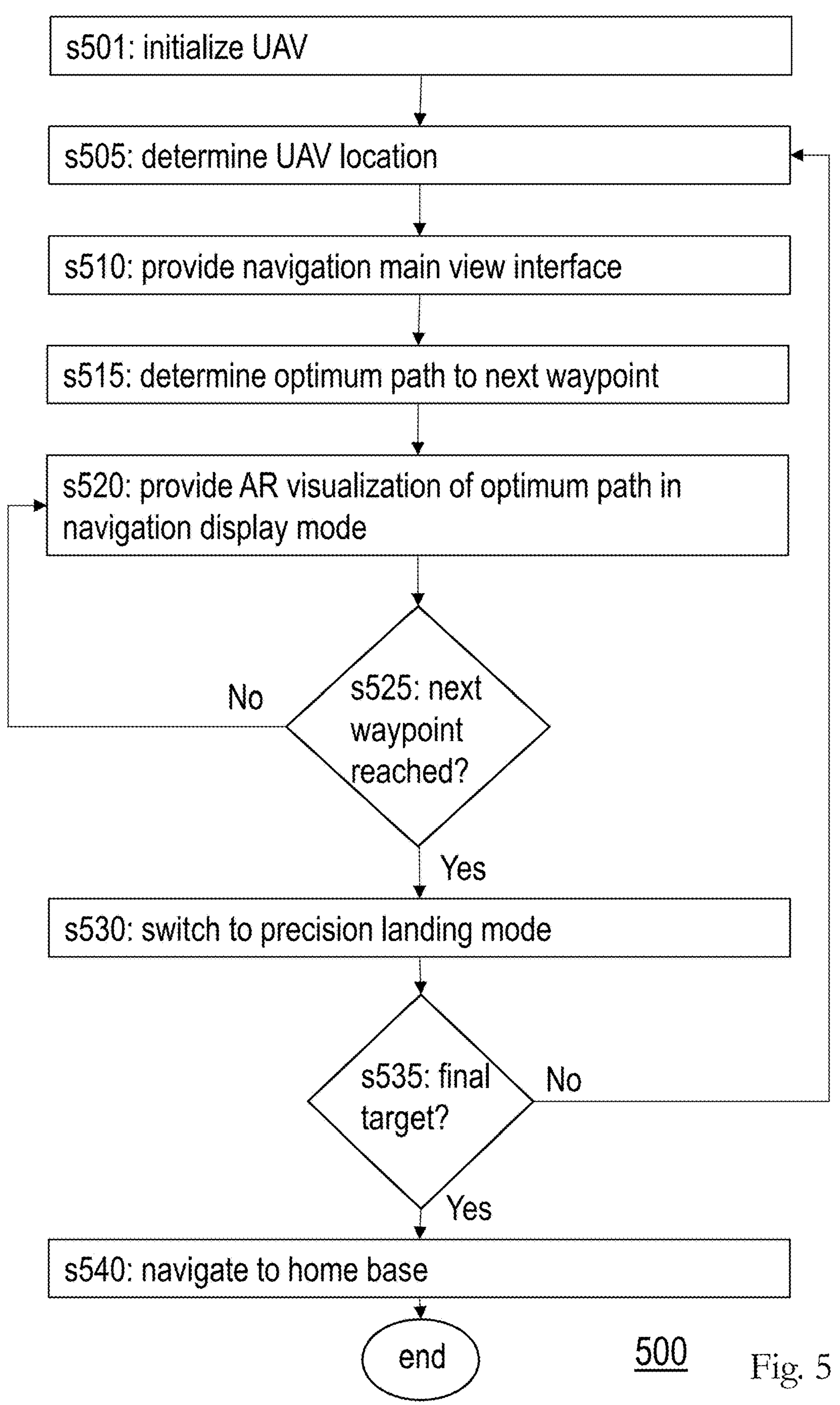
FIG. 5 is a flow chart of an example wayfinding and navigation process for a UAV using a user device according to an example implementation of the present disclosure.

FIG. 5 is a flow chart of an example wayfinding and navigation process 500 for a UAV 100 using a user device 405 according to an example implementation of the present disclosure. Process 500 is initialized, at step s501, by an activation of UAV 100 (not shown) and an execution of the associated software application by an operator—e.g., at user device 405-1. According to an exemplary embodiment, the operator is prompted to provide permission to enable location detection and to operate UAV 100 (e.g., including imaging system 220) upon initiating the software application associated with process 500.

After initialization, at step s505, localization algorithm component 305 determines the location of UAV 100 with respect to its environment—for example, using GPS. Next, at step s510, component 310 provides a main view interface (not shown) that includes a live video feed of navigation (e.g., front) camera 221-1 to user device 405-1. According to an exemplary embodiment, the main view interface further includes top view interface (not shown) that contains a search bar, where the operator can input one or more desired inspection points. In embodiments, pre-planned inspection programs that are stored, for example, at one or more of user device 405-1, processing apparatus 450, and information system 470, can be retrieved to define a series of inspection points for process 500, beginning with a first inspection point nearest a current location of UAV 100 determined at step s501 (e.g., home base 105).

Upon receiving an input from the operator of a desired inspection point, process 500 proceeds to step s515, where components 305 and 310, in cooperation with one or more navigation components (not shown) executed at user device 405-1 and/or processing apparatus 450, calculate and determine an optimum path to the desired inspection point. According to an exemplary embodiment, step s515 includes determining an acceptable fly distance and inspection time for the battery life of UAV 100, an approved flight zone route for safety and security regulations, and a path with the shortest distance between UAV 100 and the inspection point within the space of allowable paths, to name a few. In embodiments, a digital twin (full 3D reconstruction) for a facility can be used as a map that specifies safe flight zones for computing the optimum path.

Once the optimum path is determined, process 500 proceeds to step s520, where an AR visualization of the optimum path is provided to user device 405-1 in a wayfinding and navigation display mode. According to an exemplary embodiment, the wayfinding and navigation display mode corresponds to the main view interface of step s510 that includes the live video feed of navigation (e.g., front) camera 221-1 provided to user device 405-1. At step s520, the live video feed is augmented with AR elements that visualize the optimum path determined at step s515.

Figure 6:
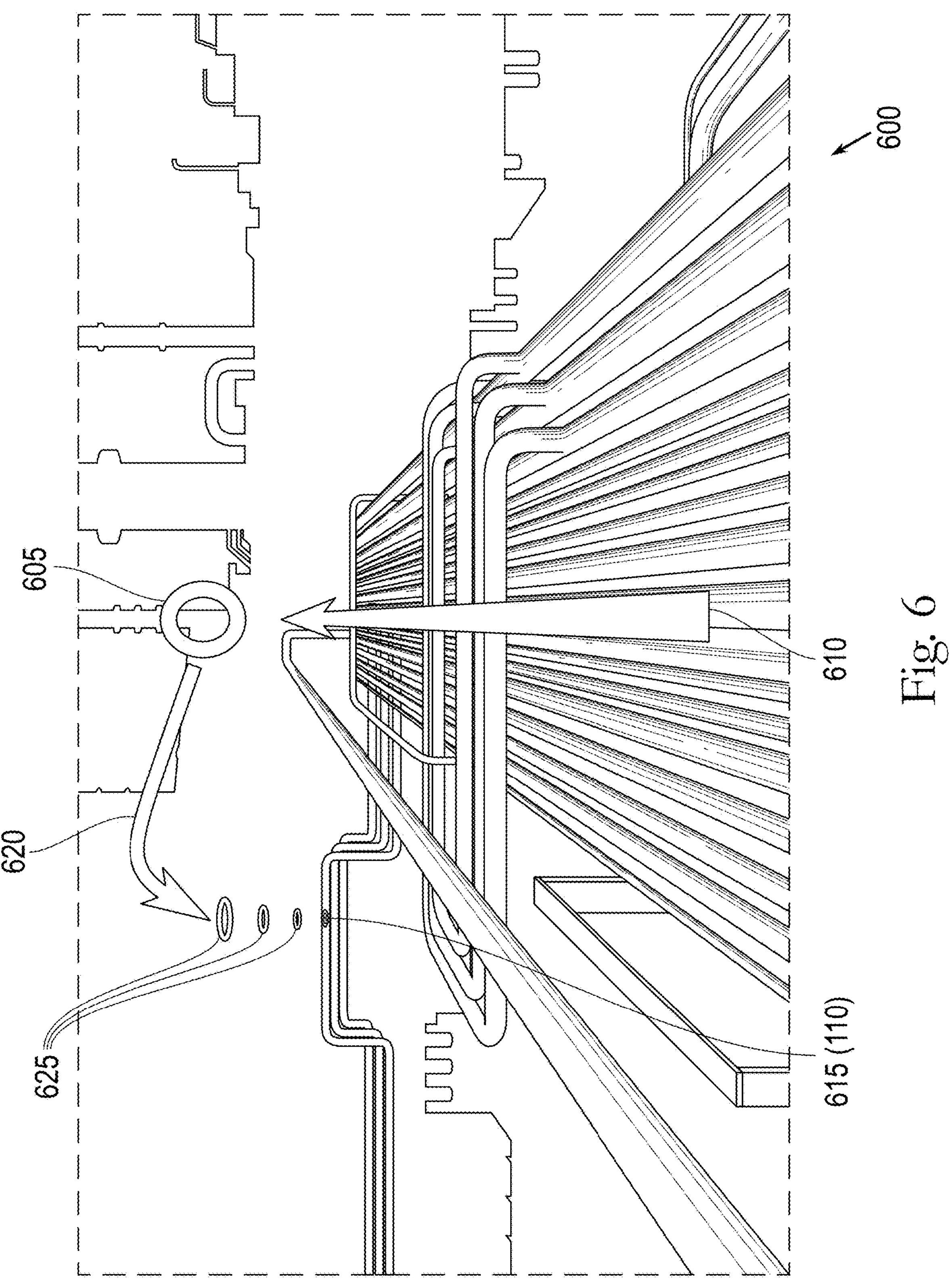
FIG. 6 is a display interface provided to a display device at a user device corresponding to the process of FIG. 5 in accordance with an example implementation of the present disclosure.

FIG. 6 is a display interface 600 provided to a display device at user device 405-1 corresponding to step s520 in accordance with an example implementation of the present disclosure. As illustrated in FIG. 6, the localization data and trip route (generated by UAV augmented control engine 300) are visualized using augmented reality (AR) elements superimposed on a live video feed (e.g., obtained by front-facing navigation camera device 221-1), which AR elements include, without limitation:

a. Navigation circles 605 anchored in 3D space that shows the waypoints along the route for a safe trip to the inspection point;

b. Navigation arrows 610 anchored in 3D space that shows the path to the waypoints; and c. A landing target 615 that shows the inspection point (110).

As illustrated in FIG. 6, landing target 615 can be further augmented with a secondary navigation arrow 620 and secondary navigation circles 625 for displaying an approximate precision landing trajectory in relation to a main waypoint navigation circle 605 to further aid the operator in controlling and navigating UAV 100 through its environment. Advantageously, the operator can follow these display elements when navigating UAV 100 to and between inspection points (110) in a facility, which display elements clearly mark an optimal path that avoids all obstacles in the environment. Thus, the operator can avoid both obvious obstacles and those that are not necessarily discernible from the view presented by the live feed of navigation camera 221-1. In embodiments, navigation circles 605 can be selectable—e.g., via user interface 415—for semi-autonomous or autonomous navigation to and between waypoints while providing display 600 to the operator for any interventions in avoiding obstacles or changing a navigation route (e.g., changes to an inspection process).

According to one example implementation, an operator of UAV 100 (e.g., through user device 405-1) sets a landing site (e.g., 615) for inspection is through a graphical user interface (GUI) (not shown) displaying a digital twin of a facility, where digital twins of inspection points are selectable and/or able to be located in three-dimensional (3D) space. Corresponding navigation maps containing the digital twins are then loaded to UAV 100 (before or during a mission). With an onboard digital twin model, UAV 100 can identify objects in its surrounding and match them with those in the model to identify what it sees and triangulate its position in 3D space. This allows UAV 100 to locate a landing site (e.g., 615) and provide the navigational display elements to land on it.

Additionally, in certain embodiments, a view of display interface 600 can be provided to another user device (e.g., user device 405-2) for obtaining input from another user in guiding the operator of user device 405-1—for example, by commenting on or adjusting one or more of the display elements. In such embodiments, a video call connection can be made from user device 405-1 to user device 405-2, which is associated with a trained expert that can lead the pilot of user device 405-1 to a desired location (navigation circle 605 of a waypoint and/or landing target 615) while flying UAV 100. According to one example implementation, the trained expert of user device 405-2 is provided with an interface to draw (or otherwise input) navigation instructions that can be shown in the view of user device 405—for example, as an additional element or an amendment to the displayed elements of display interface 600 illustrated in FIG. 6. In embodiments, a low latency 5G connection (or the like) can be used to provide a remote user (e.g., at user device 405-2) with an interface containing display interface 600 (and/or interface 700 described in further detail below with reference to FIG. 7) to monitor UAV 100 in real-time and to choose one or more landing sites (e.g., 615) in the field of view of UAV 100.

Referring back to FIG. 5, process 500 next proceeds to step s525, where a determination is made on whether a next waypoint (e.g., 605 in FIG. 6) defined at step s510 has been reached and, thus, whether the display at user device 405-1 should be switched to a precision landing mode. In accordance with an exemplary embodiment of the present disclosure, a completion of wayfinding to an inspection point is confirmed by the operator (e.g., user of user device 405-1) via user input—for example, by pressing a landing button (not shown) on display interface 600 that is shown upon reaching a waypoint (e.g., 605 in FIG. 6). Upon determining that a next waypoint has been reached and that a switch should be made to the precision landing mode ("Yes"), process 500 proceeds to step s530, where a precision landing display mode procedure is executed at user device 405-1. Otherwise ("No"), process 500 continues in the wayfinding and navigation mode until a waypoint is reached—for example, displaying a continually updated version of display interface 600 (step s515) based on updated location and optimum path determinations (step s510).

According to an exemplary embodiment, the precision landing display mode incorporates one or more AR elements that are adapted to aid the operator in a hover and/or landing operation of UAV 100—for example, to land on or near certain objects and/or sensors that are permanently placed on pipes. In one example implementation, the precision landing display mode switches the main view interface of step s510 from providing the live video feed of navigation (e.g., front) camera 221-1 to providing the live video feed of precision landing (e.g., downward facing) camera 221-2 for display at user device 405-1.

Once a precision landing (and/or hovering inspection) procedure is completed by the operator (e.g., at user device 405-1), process 500 proceeds to step s535, where a determination is made on whether an inspection program has been completed—for example, a final inspection point has been inspected. If not ("N"), process 500 restarts for a next inspection point. Otherwise ("Y"), process 500 is completed via step s540 of providing navigation back to home base 105. In embodiments, step s540 can incorporate elements of steps s515 and s525 for providing the operator of user device 405-1 with AR guidance on wayfinding and navigation to a waypoint associated with home base 105 and precision landing thereto once the waypoint is reached. In other embodiments, an autonomous navigation of UAV 100 to home base 105 can be provided—for example, upon the operator toggling a "return home" button (not shown) on display interface 600.

Figure 7:
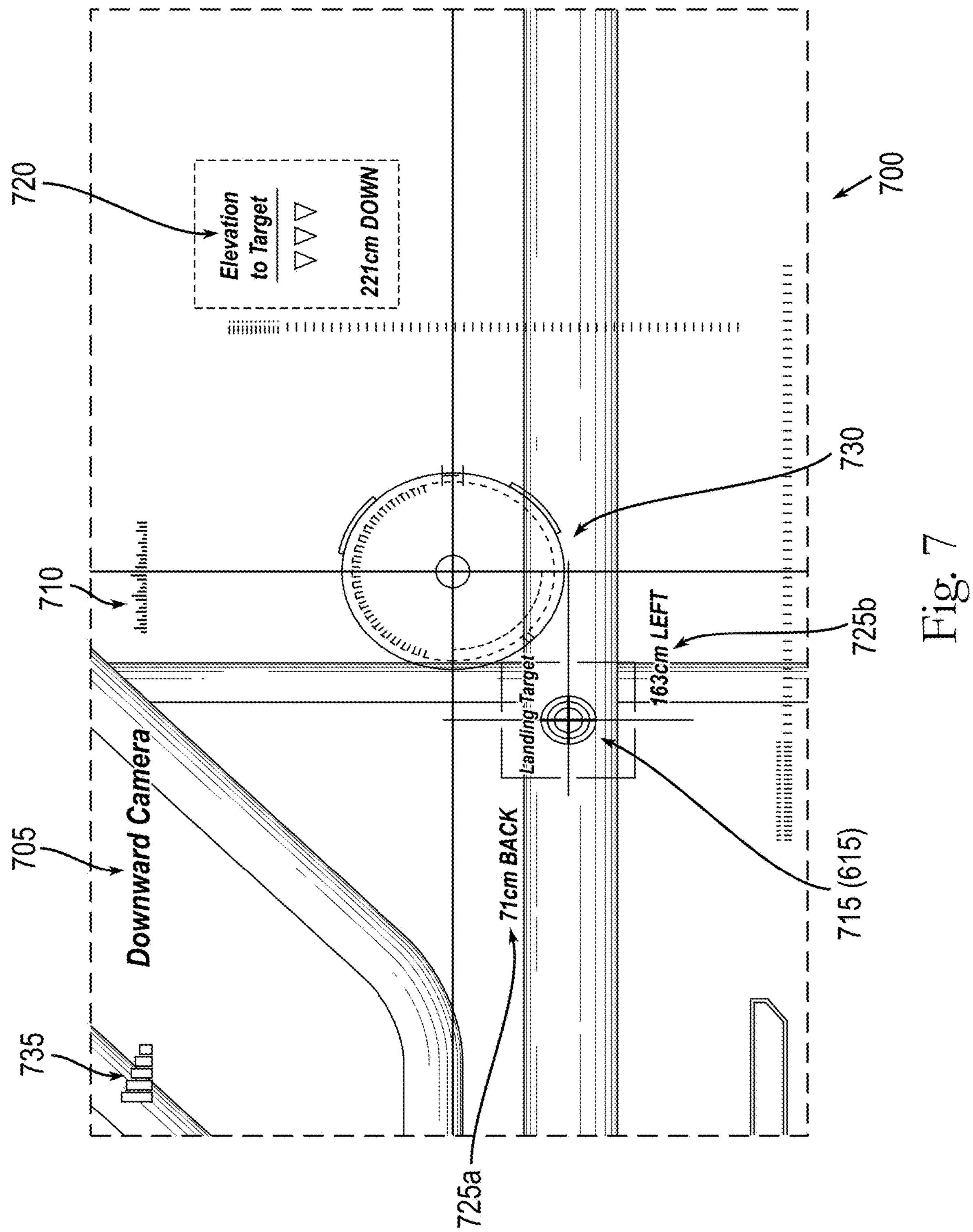
FIG. 7 is a display interface provided to a display device at a user device corresponding to the process of FIG. 5 according to an example implementation of the present disclosure.

FIG. 7 is a display interface 700 provided to a display device at user device 405-1 corresponding to step s525 according to an example implementation of the present disclosure. As illustrated in FIG. 7, the localization data and information related to landing target 615 (generated by UAV augmented control engine 300) are visualized using AR elements superimposed on a live video feed (e.g., obtained by downward-facing precision landing camera device 221-2), which AR elements include, without limitation:

A direction 705 of the camera (e.g., 221-2) from which the live feed is being displayed;

Current elevation measurements 710;

A visualized target location (scope/target shape) 715 (e.g., of landing target 615);

Vertical 720 and horizontal 725*a* and 725*b* distance measurements from the target with respect to UAV 100;

A visualized drone location (crosshair shape) 730 to indicate a current position of UAV 100;

A Signal strength 735; and

A Battery life 740.

According to an exemplary embodiment, localization algorithm component 305 supported with embedded sensors 215 (e.g., LIDAR) in the UAV flight control system 200 of UAV 100 measures and computes the data associated with the above visualized display elements. In embodiments, UAV 100, user device 405, and processing apparatus 450 can retrieve information from a cloud or plant communication network (e.g., information system 470 via network 400) related to the inspection point/pipe and show to the user relevant data about its integrity, status, current and historical readings. Additionally, UAV 100 can interact with wireless beacons (not shown) installed on the infrastructure (e.g., structure 115) to aid in pinpointing the location of the inspection point during landing.

Advantageously, the operator of user device 405-1 can toggle between display interfaces 600 (FIG. 6) and 700 (FIG. 7) for the respective operation modes of UAV 100 so that the view is customized for the respective tasks—e.g., wayfinding and precision landing—of UAV 100.

According to one implementation of the present disclosure, UAV 100 performs certain checks immediately before touching down on a landing spot (e.g., visualized target 715 for landing target 615) at a waypoint that is very near a structure (e.g., pipe 115). These checks are useful to ensure successful landing and subsequent inspection of the structure (e.g., pipe 115) and comprise one or more of:

- analyzing landing site suitability for landing (e.g., empty space and enough clearance from obstacles);
- analyzing landing site suitability for strong magnetic adhesion—for example, using electromagnetic coils (such as, eddy current coils) (not shown) to analyze the ferromagnetic properties of the landing site structure (e.g., pipe 115) to avoid cases where strong magnetic adhesion is not possible;
- analyzing landing site suitability to conduct inspections—for example, clearance from flanges or other obstacles between a landing site (e.g., landing target 615) and an inspection point (e.g., inspection point 110) so that a crawler (not shown and, for example, as described in the '498 Patent) can be deployed from UAV 100 and would not be obstructed;
- providing information to the operator about remaining battery life UAV 100 so that a decision can be made on whether it would be worthwhile to land on the structure (e.g., pipe 115) and continue with the inspection job, or if the remaining charge dictates a need to return to home; and
- conducting a close-up 3D scan of the surrounding infrastructure (e.g., pipe 115) during a precision landing to build a detailed digital twin model for subsequent navigation and precision landing operations.

In embodiments, the data and results from the above checks are reported to information system 470 for subsequent use and/or further processing.

In embodiments, the AR guidance during in precision landing mode can be used to perform inspections without actual landings on a structure, such as pipe 115. In such a "precision approach mode," UAV 100 is navigated to the proximate vicinity of a structure—e.g., pipe 115—and to perform inspections using techniques such as (but not limited to) X-ray, close-by thermal infrared imaging, electromagnetic-based inspection, and the like. Additionally, the "precision landing mode" or "precision approach mode" is not limited to inspections but can also be used for light maintenance work. For example, in embodiments, UAV 100 can be navigated to the proximity of a target (e.g., in the navigation mode of FIG. 6) and, while in the precision approach display mode of FIG. 7, perform maintenance tasks, such as sandblasting, water-jet cleaning, painting, welding, and the like. In embodiments, UAV 100 can incorporate a supply hose, storage tank, or the like (not shown) for performing the aforementioned maintenance tasks.

In embodiments, step s525 for precision landing can include confirmation of a landing of UAV 100 at visualized target location 715 and/or an inspection reading associated with the corresponding inspection point (e.g., 110) from the inspected structure (e.g., 115). Upon such confirmation, the precision landing procedure of step s525 is completed and UAV 100 can depart from the visualized target location 715 towards another waypoint or home base 105 with the navigation display mode (e.g., display interface 600) providing navigation guidance to the operator. In embodiments, an autonomous navigation of UAV 100 to home base 105 can be provided—for example, upon the operator toggling a "return home" button (not shown) on display interface 700—upon a determination (at step s535 of process 500) that a final inspection has been completed.

Figure 8A:
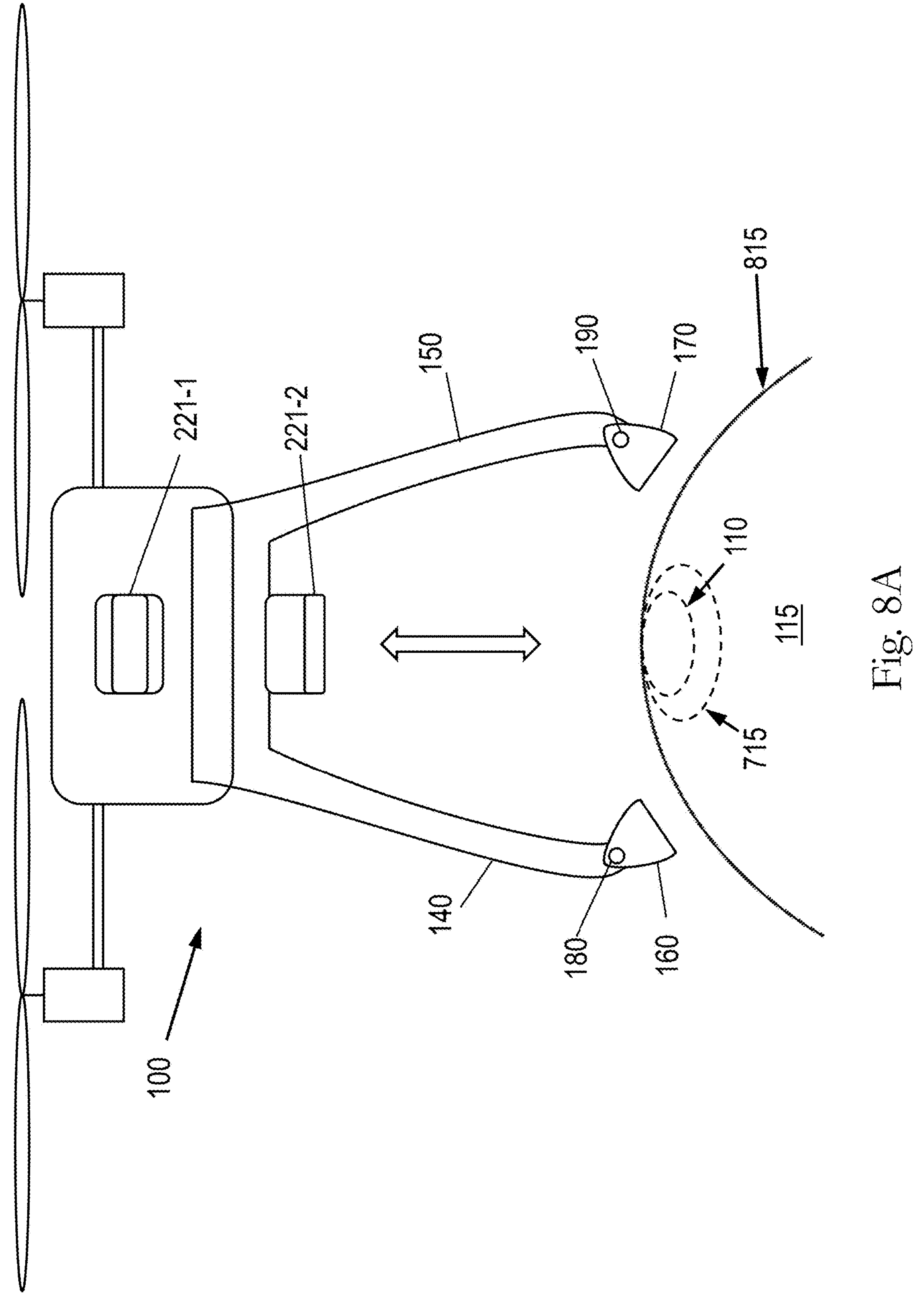
FIG. 8A is a profile illustration of a UAV according to an example implementation of the present disclosure.
Figure 8B:
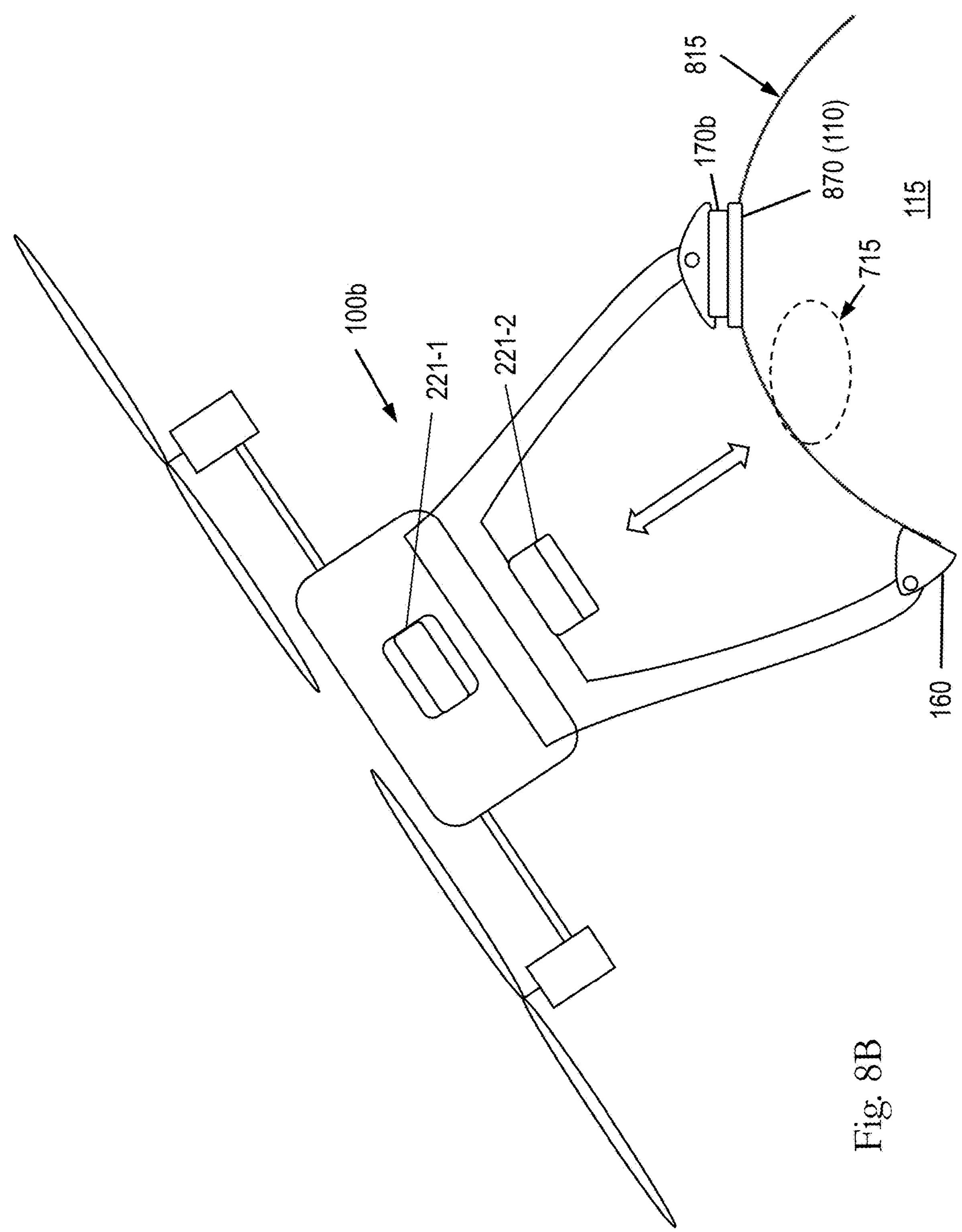
FIG. 8B is a profile illustration of a UAV according to an example implementation of the present disclosure.
Figure 8C:
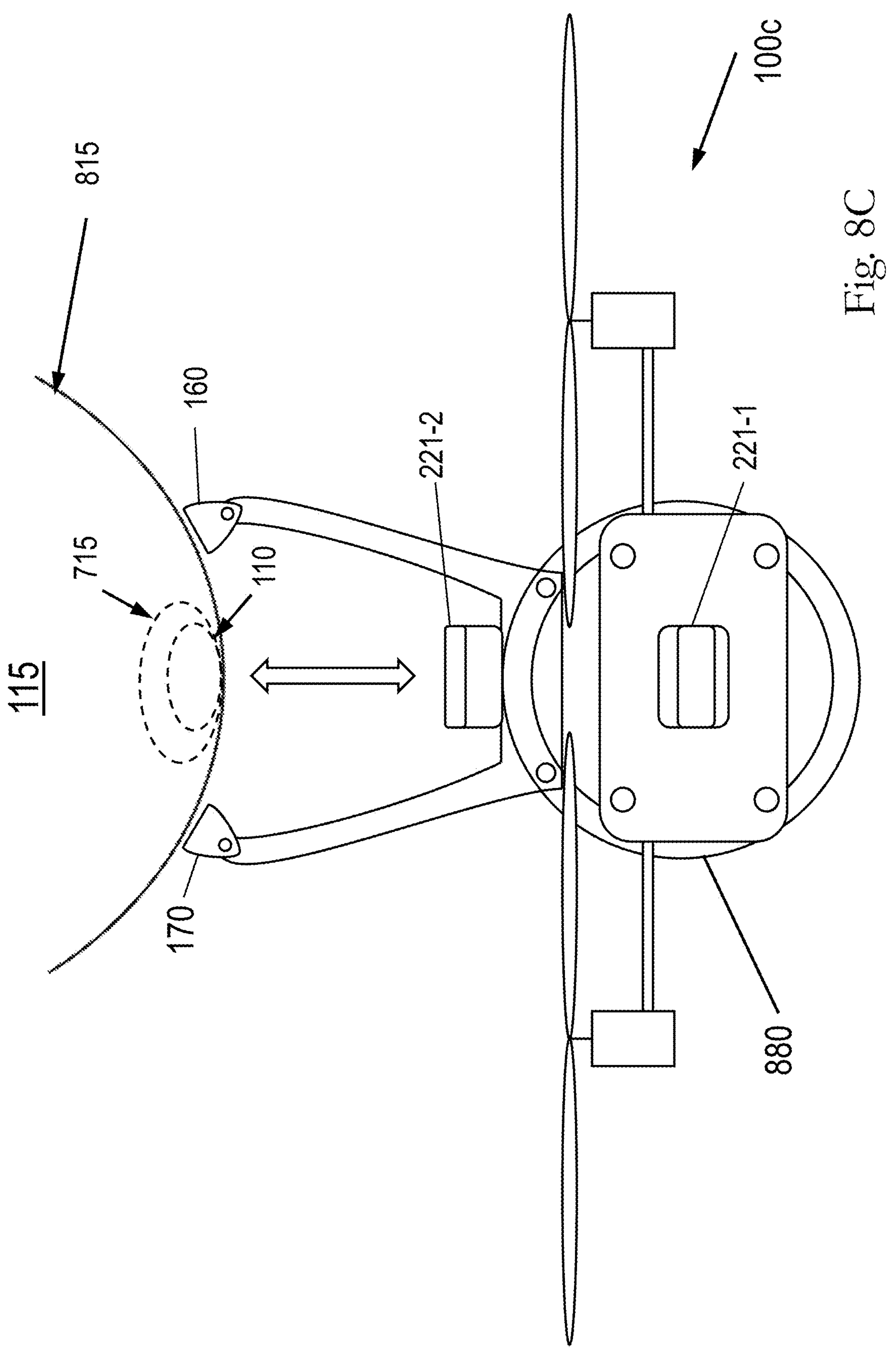
FIG. 8C is a profile view of an example UAV having a rotatable mechanism according to an example implementation of the present disclosure.

In certain embodiments, the visualized target location 715 can be on a top surface, a side surface, or a bottom surface of an inspected structure 115. Correspondingly, the visualized target location 715 for precision landing can overlap with or be at a predetermined distance from an associated inspection point 110 at the various orientations on an inspected structure 115. FIGS. 8A, 8B, and 8C are schematic front views of UAVs 100, 100*b*, and 100*c*, respectively, that are adapted for alternative orientations of visualized target locations 715 in accordance with exemplary embodiments of the present disclosure.

FIG. 8A is a profile illustration of a UAV 100 according to an example implementation of the present disclosure. As illustrated in FIG. 8A, UAV 100 includes at least one pair of legs 140 and 150 that are respectively adapted to attach to structure 115 for inspecting structure 115. To this end, each leg 140 and 150 incorporates an articulated magnet 160 and 170 via a respective rotatable coupling 180 and 190. Articulated magnets 160 and 170 are mounted to legs 140 and 150 to allow for orienting towards and adhering to a curved ferromagnetic surface 815 on structure 115 when the UAV 100 approaches and aligns with visualized target location 715, which overlaps inspection point 110, at a top portion of structure 115. According to an exemplary embodiment, structure 115 is an industrial pipe and at least a portion of outer surface 815 is a ferromagnetic surface—for example, steel and the like. As illustrated in FIG. 8A, outer surface 815 is a curved surface in correspondence with an outer shape of a pipe and inspection point 110 (and visualized target location 715) is disposed near a 12 o'clock position at a top portion of surface 815. In an example implementation, articulated magnets 160 and 170 operate according to the disclosure in the '796 Patent entitled "Articulated Magnet-Bearing Legs for UAV Landing on Curved Surfaces," which is hereby incorporated by reference. Once magnets 160 and 170 are adhered to surface 815, UAV 100 is stabilized to structure 115 and one or more inspection processes can be conducted upon inspection point 110. In embodiments, the propulsion system 210 (e.g., rotors) of UAV 100 can be temporarily deactivated while magnets 160 and 170 are attached to surface 815 until the inspection processes are completed to conserve energy and to thereby prolong the operating cycle of UAV 100. Once the inspection completed, the propulsion system 210 (e.g., rotors) of UAV 100 is activated (and/or magnets 160 and 170 are deactivated) to detach UAV 100 from surface 815 (with a return to navigation display mode for navigation to a next waypoint or home base 105). For ease of description, it is assumed throughout that structure 115 is larger (such as significantly larger) than UAV 100. In other words, the figures are not to scale and are for illustrative purposes only. According to the present disclosure structure 115 is larger in every dimension than UAV 100 so that UAV 100 can readily attach to the surface 815. Additionally, while FIG. 8A (as well as FIGS. 8B and 8C) illustrates a pair of legs 140 and 150, it should be understood that UAV 100 can incorporate four (or any number) of such legs with corresponding configurations, as shown in FIGS. 1 and 2B. It should also be appreciated that an inspection can be conducted by UAV 100 on inspection point 110 without landing on structure 115—for example, in a controlled precision hover while the precision landing display mode is provided to user device 405-1.

FIG. 8B is a profile illustration of a UAV 100*b* according to an example implementation of the present disclosure. As illustrated in FIG. 8B, UAV 100*b* incorporates a sensor scanning device 170*b* in place of magnet 170. UAV 100*b* is flown to a proximity of a sensor 870 that is disposed at least partially at a top portion of an outer surface 815 of structure 115. Sensor 870 and sensor scanning device 170*b* operate according to the disclosure in U.S. patent application Ser. No. 17/655,128 filed on Mar. 16, 2022 for Asfoor et al. entitled "SYSTEM, APPARATUS, AND METHOD FOR INSPECTING INDUSTRIAL STRUCTURES USING A UAV," which is hereby incorporated by reference. Accordingly, sensor 870, which can be a UT sensor that is powered by EM signals via a transducer (not shown), embodies inspection point 110 and UAV 100*b* is controlled via the precision landing display mode to land on structure 115 in alignment with visualized target location 715, which is a predetermined distance from sensor 870 so that sensor scanning device 170*b* is aligned with sensor 870. In accordance with an example implementation, sensor scanning device 170*b* transmits an electromagnetic (EM) signal (not shown), which provides electrical power to sensor 870 to thereby activate it for reading a thickness (e.g., a wall thickness) of structure 115. Once activated, sensor 870 determines an internal thickness of structure 115 at the location of sensor 115. In embodiments, sensor 870 can embody a wireless combustible gas sensor and device 170*b* can incorporate one or more mechanisms to recharge a battery of sensor 870 and/or perform calibrations on sensor 870.

Thus, in embodiments, the precision landing interface (e.g., display interface 700) can accommodate landing/attaching UAV 100/100*b* on a side of a pipe instead of a top portion thereof. In certain embodiments, camera device 221-1 or another forward-facing camera (e.g., 221-*n*) can used for providing precision landing display interface 700. Alternatively, a tilting camera (e.g., 221-*n*) can be used for both navigation and precision landing. In such embodiments, precision landing display interface 700 can incorporate up/down indicators (not shown) in place of forward/backward indicator 725*a* on the crosshair of the visualized target location 715 in addition to the existing left/right indicator 725*b*. Correspondingly, forward/backward indication (not shown) would replace the vertical elevation indicator 720 as a distance indicator in place of the elevation indicator. According to another embodiment, the precision landing display interface 700 can also accommodate landing on a bottom portion of a pipe using an upward-facing camera.

FIG. 8C is a profile view of an example UAV 100*c* having a rotatable mechanism 880 (e.g., a circular rail) for rotating and reorienting magnets 160 and 170, along with precision landing camera device 221-2, according to an example implementation. In some implementations, UAV 100*c* includes a motor or actuator (not shown) for rotating magnets 160 and 170, as well as precision landing camera device 221-2, to a suitable orientation, including during flight (e.g., dynamic rotation). In some other implementations, mechanism 880 can be manually rotated to a desired orientation prior to a mission (e.g., static rotation).

In an example of a motorized implementation, the motorized system provides for dynamically changing (or adjusting) the orientation of magnets 160 and 170, as well as precision landing camera device 221-2, either by an operator (e.g., at user device 405-1) or by a preprogrammed algorithm. In this arrangement, a motor is employed to rotate magnets 160 and 170, along with a precision landing camera device 221-2, circumferentially about the UAV 100*c*. Accordingly, UAV 100*c* can automatically (or via operator control) change its orientation (e.g., during flight) depending on factors such as observed or otherwise known obstacles. In an example implementation of the present disclosure and as illustrated in FIG. 8C, the orientation of UAV 100*c* is adjustable in accordance with the location of inspection point 110 and its corresponding visualized target location 715 around structure 115, including an underside of structure 115. Advantageously, especially for a dynamic rotation implementation, UAV 100*c* can rotate throughout the course of an inspection run to orient differently on the structure 115 while maintaining a level flight. In the illustrated orientation of FIG. 8C, for example, UAV 100*c* approaches and lands upward from under structure 115 while maintaining level flight and keeping clear from structure 115.

Again, it should be appreciated that inspections can be carried out by UAV 100*b* and 100*c* on inspection point 110 (870) without landing on structure 115—for example, in a controlled precision hover while the precision landing display mode is provided to user device 405-1. Advantageously, UAV 100 (and 100*b*/100*c*) can be utilized to land near sensors (e.g., combustible gas sensors or infrastructure sensors) for communications and operations therewith (such as battery recharges, calibrations, and/or data retrieval) and/or land near a valve and perform maintenance actions.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all implementations or arrangements.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-*b*). Description of elements with references to the base reference numerals (e.g., 210) also refer to all specific examples with such letter suffixes (e.g., 210-*b*), and vice versa.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof and meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to implementations of the disclosure without departing from the essential scope thereof. Therefore, it is intended that the disclosure not be limited to the particular implementations disclosed, or to the best mode contemplated for carrying out this disclosure, but that the disclosure will include all implementations falling within the scope of the appended claims.

The subject matter described above is provided by way of illustration only and should not be construed as limiting. Various modifications and changes can be made to the subject matter described herein without following the example implementations and applications illustrated and described, and without departing from the true spirit and scope encompassed by the present disclosure, which is defined by the set of recitations in the following claims and by structures and functions or steps which are equivalent to these recitations.

What is claimed is:

1. A system, comprising:

an unmanned aerial vehicle (UAV), the UAV comprising one or more location and orientation sensors, a first camera device, and a second camera device;

a first computing device communicatively coupled to the UAV; and a second computing device communicatively coupled to one or more of the first computing device and the UAV, wherein the first computing device comprises a processor and a memory having stored thereon machine-readable instructions that cause the processor, when executed, to:

obtain localization data associated with the UAV in relation to an environment of the UAV from the one or more location and orientation sensors of the UAV;

execute a navigation process by:

obtaining a live video moving image from the first camera device of the UAV;

determining a waypoint associated with an inspection point for inspecting a structure;

generating a navigation display interface for display on a first display device, the navigation display interface comprising a plurality of navigation augmented reality (AR) display elements related to the determined waypoint superimposed over the live video moving image obtained from the first camera device of the UAV; and transmitting the navigation display interface to the second computing device, wherein the plurality of navigation AR display elements are generated based on the localization data obtained from the one or more location and orientation sensors of the UAV.

2. The system of claim 1, wherein the navigation display interface is transmitted from the first computing device to the second computing device via a video call connection.

3. The system of claim 2, wherein the video call connection comprises a 5G connection.

4. The system of claim 1, wherein the second computing device comprises:

a communication interface adapted to receive the navigation display interface from the first computing device;

a second display device adapted to display the navigation display interface; and a user interface adapted to receive one or more user inputs to the navigation display interface, wherein the one or more user inputs are transmitted to the first computing device via the communication interface.

5. The system of claim 4, wherein the one or more user inputs are displayed on the first display device.

6. The system of claim 4, wherein the one or more user inputs are displayed on the first display device.

7. The system of claim 1, wherein the memory stores additional machine-readable instructions that cause the processor, when executed, to:

execute a precision landing process when the UAV reaches the determined waypoint by:

obtaining a live video moving image from the second camera device of the UAV;

generating a precision landing display interface for display on the first display device, the precision landing display interface comprising a plurality of precision landing AR display elements related to a landing target associated with the determined waypoint superimposed over the live video moving image obtained from the second camera device of the UAV; and transmitting the precision landing display interface to the second computing device wherein the plurality of precision landing AR display elements are generated based on the localization data obtained from the one or more location and orientation sensors of the UAV.

8. The system of claim 7, wherein the second computing device comprises:

a communication interface adapted to receive the precision landing display interface from the first computing device;

a second display device adapted to display the precision landing display interface; and a user interface adapted to receive one or more user inputs to the precision landing display interface, wherein the one or more user inputs are transmitted to the first computing device via the communication interface.

9. A method, comprising:

obtaining, at a first computing device from an unmanned aerial vehicle (UAV), localization data associated with the UAV in relation to an environment of the UAV from one or more location and orientation sensors of the UAV;

executing, at the first computing device, a navigation process by:

obtaining a live video moving image from a first camera device of the UAV;

determining a waypoint associated with an inspection point for inspecting a structure;

generating a navigation display interface for display on a first display device of the first computing device, the navigation display interface comprising a plurality of navigation augmented reality (AR) display elements related to the determined waypoint superimposed over the live video moving image obtained from the first camera device of the UAV; and transmitting the navigation display interface to a second computing device, wherein the plurality of navigation AR display elements are generated based on the localization data obtained from the one or more location and orientation sensors of the UAV.

10. The method of claim 9, wherein the navigation display interface is transmitted from the first computing device to the second computing device via a video call connection.

11. The method of claim 10, wherein the video call connection comprises a 5G connection.

12. The method of claim 9, further comprising:

receiving, at the second computing device via a communications interface, the navigation display interface from the first computing device;

displaying, on a second display device of the second computing device, the navigation display interface; and receiving, at the second computing device via a user interface, one or more user inputs to the navigation display interface, transmitting, to the first computing device via the communication interface, the one or more user inputs.

13. The method of claim 12, wherein the one or more user inputs are displayed on the first display device.

14. The method of claim 9, further comprising:

executing, at the first computing device, a precision landing process when the UAV reaches the determined waypoint by:

obtaining a live video moving image from a second camera device of the UAV;

generating a precision landing display interface for display on the first display device, the precision landing display interface comprising a plurality of precision landing AR display elements related to a landing target associated with the determined waypoint superimposed over the live video moving image obtained from the second camera device of the UAV; and transmitting the precision landing display interface to the second computing device, wherein the plurality of precision landing AR display elements are generated based on the localization data obtained from the one or more location and orientation sensors of the UAV.

15. The method of claim 14, further comprising:

receiving, at the second computing device via a communications interface, the precision landing display interface from the first computing device;

displaying, on a second display device of the second computing device, the precision landing display interface; and receiving, at the second computing device via a user interface, one or more user inputs to the precision landing display interface, transmitting, to the first computing device via the communication interface, the one or more user inputs.

16. The method of claim 15, wherein the one or more user inputs are displayed on the first display device.

17. An unmanned aerial vehicle (UAV), comprising:

a controller;

a plurality of location and orientation sensors;

an imaging system comprising a navigation imaging camera, a precision landing imaging camera, and one or more depth or stereo cameras; and a communication interface adapted to communicate with a computing device, wherein the controller is adapted to:

operate the UAV in a navigation mode by:

determining a location of the UAV based at least in part on information captured using the one or more depth or stereo cameras and the plurality of location and orientation sensors;

relaying a first live video moving image from the navigation imaging camera to the computing device; and transmitting navigation localization data corresponding to one or more augmented reality (AR) navigation display elements to the computing device, the navigation localization data being obtained using the one or more depth or stereo cameras and the plurality of location and orientation sensors; and upon determining that the location of the UAV is proximate a waypoint associated with an inspection point for inspecting a structure, operate the UAV in a precision landing mode by:

relaying a second live video moving image from the precision landing imaging camera to the computing device;

transmitting precision landing localization data corresponding to one or more AR prevision landing display elements to the computing device, the navigation localization data being obtained using the one or more depth or stereo cameras and the plurality of location and orientation sensors.

18. The UAV of claim 17, wherein the navigation localization data comprises Visual Odometry (VO) or Visual Inertial Odometry (VIO) based on information captured by the imaging system in conjunction with data from the plurality of location and orientation sensors.

19. The UAV of claim 17, wherein the precision landing localization data comprises a three-dimensional (3D) point cloud from the plurality of location and orientation sensors for determining a landing target location.

* * * * *